US009948594B2

(12) United States Patent
Stan et al.

(10) Patent No.: US 9,948,594 B2
(45) Date of Patent: Apr. 17, 2018

(54) CONTROLLING MESSAGE PUBLICATION FOR A USER

(75) Inventors: Johann Stan, Saint-Etienne (FR); Nicolas Marie, Paris (FR)

(73) Assignee: Alcatel Lucent, Boulogne-Billancourt (FR)

( * ) Notice: Subject to any disclaimer, the term of this patent is extended or adjusted under 35 U.S.C. 154(b) by 420 days.

(21) Appl. No.: 14/001,042

(22) PCT Filed: Mar. 14, 2012

(86) PCT No.: PCT/EP2012/054492
§ 371 (c)(1),
(2), (4) Date: Nov. 6, 2013

(87) PCT Pub. No.: WO2012/123509
PCT Pub. Date: Sep. 20, 2012

(65) Prior Publication Data
US 2014/0059135 A1   Feb. 27, 2014

(30) Foreign Application Priority Data
Mar. 16, 2011   (FR) ...................................... 11 52146

(51) Int. Cl.
*G06F 15/16*   (2006.01)
*H04L 12/58*   (2006.01)
(Continued)

(52) U.S. Cl.
CPC .............. *H04L 51/32* (2013.01); *G06F 17/27* (2013.01); *G06Q 10/10* (2013.01); *G06Q 50/01* (2013.01); *H04L 51/12* (2013.01)

(58) Field of Classification Search
CPC ................................ H04L 51/32; H04L 51/12
(Continued)

(56) References Cited

U.S. PATENT DOCUMENTS 6,438,632 B1 * 8/2002 Kikugawa ..................... 710/100
6,754,665 B1   6/2004 Futagami et al.
(Continued)

FOREIGN PATENT DOCUMENTS

CN   101576887 A   11/2009
CN   101827067 A   9/2010
(Continued)

OTHER PUBLICATIONS

Josh Costine, "Facebook Adds Keyword Moderation and Profanity Blocklist to Pages," XP055010759, 3 pages, Feb. 10, 2011.
(Continued)

*Primary Examiner* — Suraj Joshi
*Assistant Examiner* — Kaylee Huang
(74) *Attorney, Agent, or Firm* — Fay Sharpe, LLP

(57) ABSTRACT

To control publication of messages within a social networking server (SRS) from a communication terminal (TC), a server (SC) capable of communicating with the social networking server (SRS) intercepts a message (Mes) containing text data (DonT), the message being provided by a user registered on the social networking server (SRS) and intended to be published by the social networking server (SRS). The server (SC) extracts keywords associated with the text data (DonT) based on a semantic analysis of the text data, and blocks publication of the message (Mes) if at least one extracted keyword is included in a set of keywords (EnsMC) associated with another user registered on the social networking server (SRS), said user being included on a list (LC) initially defined by said other user.

10 Claims, 2 Drawing Sheets

Figure 1:
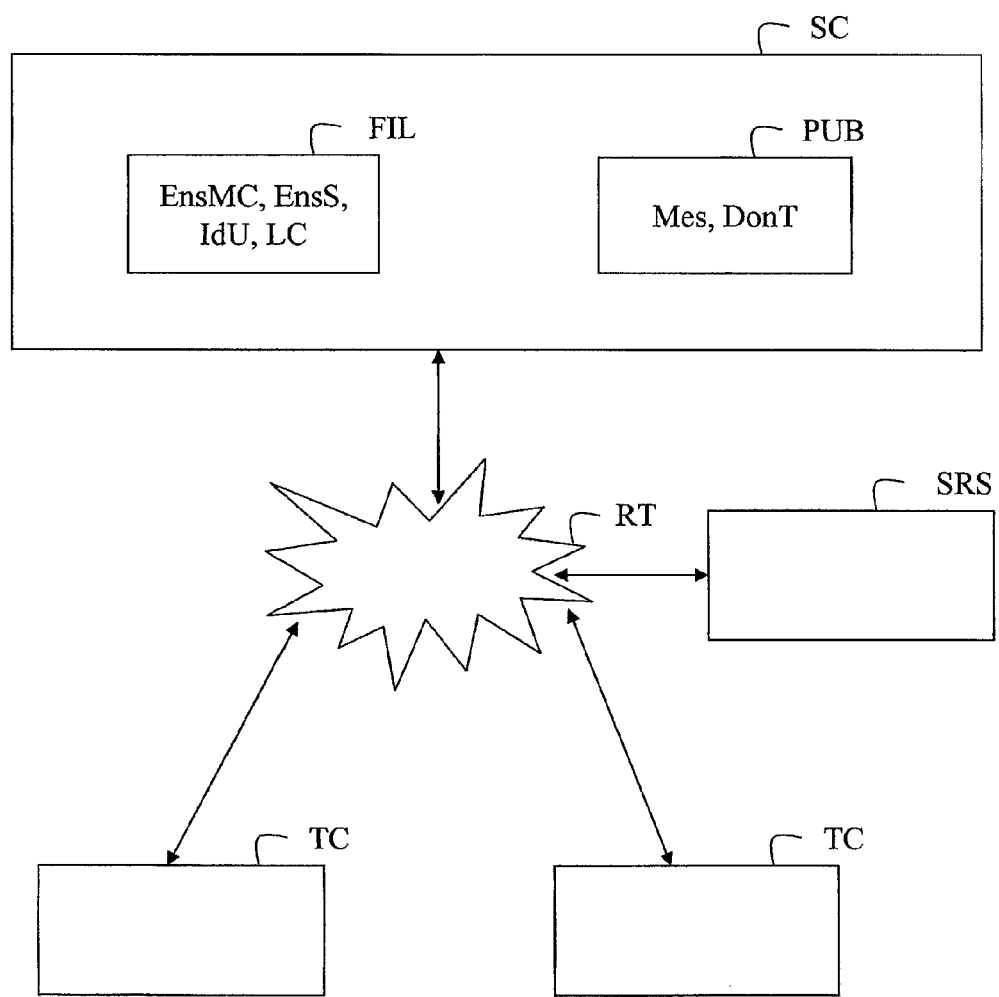

(51) Int. Cl.
*G06F 17/27* (2006.01)
*G06Q 10/10* (2012.01)
*G06Q 50/00* (2012.01)

(58) Field of Classification Search
USPC ........ 709/204, 205, 206, 207, 217, 218, 225
See application file for complete search history.

(56) References Cited

U.S. PATENT DOCUMENTS

| | | | |
|---|---|---|---|
| 2006/0143307 A1* | 6/2006 | Codignotto | 709/246 |
| 2008/0294628 A1* | 11/2008 | Shoval et al. | 707/5 |
| 2011/0179026 A1* | 7/2011 | Mulligen | G06F 17/30616 707/728 |

FOREIGN PATENT DOCUMENTS

| | | |
|---|---|---|
| EP | 1 003 105 A1 | 5/2000 |
| EP | 1 995 669 A1 | 11/2008 |
| JP | 2001-5833 A | 1/2001 |
| JP | 2010-97336 A | 4/2010 |
| WO | WO 02/06997 A2 | 1/2002 |
| WO | WO 2010/147828 A1 | 12/2010 |

OTHER PUBLICATIONS

Philippe Karger et al., "Reactivity and Social Date: Keys to Drive Decisions in Social Network Applications," 2$^{nd}$ International Workshop on Social Data on the Web in conjunction with the 8$^{th}$ International Semantic Web Conference (ISWC), XP055010768, 12 pages, Oct. 1, 2009.
E. Momeni, "Towards (Semi-) Automatic Moderation of Social Web Annotations," Social Computing, IEEE, Second International Conference, XP031767013, pp. 1123-1128, Aug. 20, 2010.
International Search Report for PCT/EP2012/054492 dated Apr. 26, 2012.

* cited by examiner

CONTROLLING MESSAGE PUBLICATION FOR A USER

The present invention pertains to controlling message publication for a user.

Currently, social networking sites enable users to share content in the form of messages and multimedia resources, such as images and videos. Such messages typically describe the user's current activity or a resource that the user finds interesting to share with the community.

The disadvantage of this activity is that shared content may potentially contain information that could harm other users. For a given user, privacy protection is often considered as part of managing personal data, but the content published by this user may involve other users and have a negative impact upon their person through the social networking community.

In one example, a user named Bob does not fill in the field for his date of birth in his profile on a social networking site, as he does not wish to make his date of birth public. A friend of Bob named Alex knows this date and on Bob's birthday, Alex publishes a message such as, "Happy Birthday Bob!" Therefore, users of the social network can deduce his birthday from the message and save it, before Bob connects to the site and removes the published message after the fact.

Similarly, any of a user's contacts could reveal sensitive information about the user inadvertently or intentionally and maliciously.

Often, managing privacy protection is carried out after publication of a message, which means that the publication of a message harmful to a user may be executed without that user's consent.

Additionally, an image may be uploaded to the social networking site and linked to a label showing Bob in a compromising situation (for example after a party). The photo may be seen by all of Bob's contacts until he removes the tag. Meanwhile, the undesirable content has been able to be displayed and propagated.

Therefore, there is a need to prevent the publication of information about users that could be harmful to them.

To remedy these disadvantages, a method for controlling the publication of messages on a social networking server, comprises the following steps within a server capable of communicating with the social networking server:

Intercepting a message containing text data, the message being provided by a user registered on the social networking server, and intended to be published by the social networking server, Extracting keywords associated with the text data, based on a semantic analysis of the text data, Blocking the publication of the message if at least one extracted keyword is included in a set of keywords associated with another user registered with the social networking server, said user being included on a list initially defined by said other user.

Advantageously, the invention offers real time management of privacy protection within a social networking site, by blocking any message whose content could harm a given user, and by alerting him or her to the attempt to publish the message.

According to another characteristic of the invention, the set of keywords may have a contextual and semantic relationship with the keywords initially defined by said other user.

According to another characteristic of the invention the keywords initially defined by said other user may be included in the set of keywords.

According to another characteristic of the invention, each keyword initially defined by said other user may be disambiguated and associated with a concept by using a given ontology.

According to another characteristic of the invention, the set of keywords may contain keywords associated with concepts that are semantically and contextually linked with concepts associated with the keywords initially defined by said other user.

According to another characteristic of the invention, the set of keywords may contain synonyms of the keywords initially defined by said other user.

According to another characteristic of the invention, the server may alert said other user of the attempt to publish the message and request authorisation from said other user to publish the message.

According to another characteristic of the invention, said other user may assign a valid period to at least one keyword initially defined by said other user.

According to another characteristic of the invention, said other user may assign a score to at least one keyword initially defined by said other user.

The invention also pertains to a server for controlling the publication of messages within a social networking server, the server being capable of communicating with the social networking server and comprising:

Means to intercept a message containing text data, the message being provided by a user registered on the social networking server, and intended to be published by the social networking server, Means to extract the keywords associated with the text data based on a semantic analysis of the text data, Means to block the publication of the message if at least one extracted keyword is included in a set of keywords associated with another user registered with the social networking server, said user being included on a list initially defined by said other user.

The invention also pertains to a computer program capable of being implemented within a server, said program comprising instructions which, whenever the program is executed within said server, carry out the steps according to the inventive method.

Figure 2:
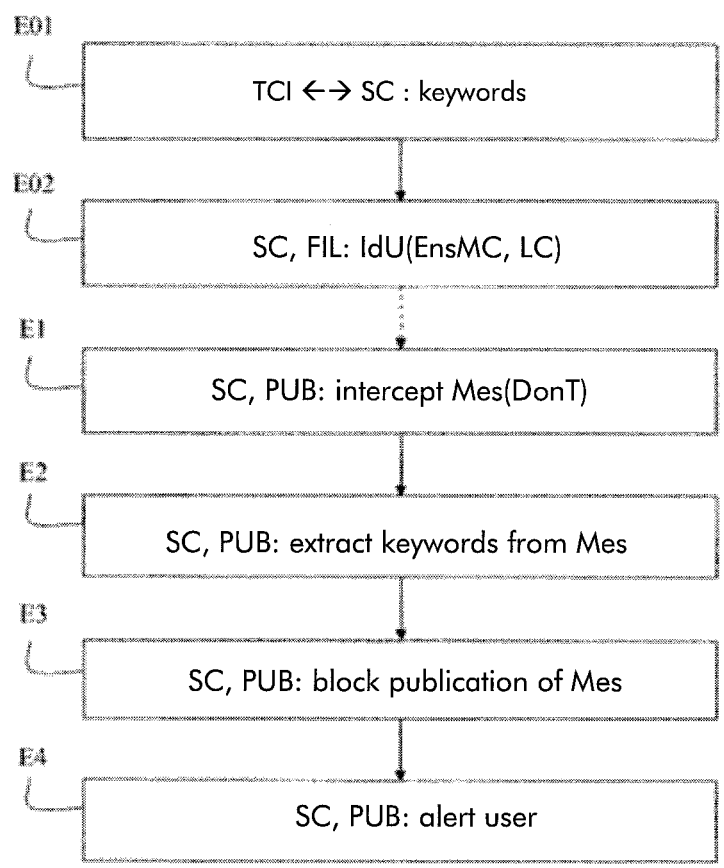

The present invention and the benefits thereof shall be better understood upon examining the description below, which makes reference to the attached figures, in which:

FIG. 1 is a schematic block diagram of a communication system according to one embodiment of the invention, and FIG. 2 is an algorithm of a method for controlling publication of messages according to one embodiment of the invention.

With reference to FIG. 1, a communication system comprises a control server SC, a social networking server SRS, at least two communication terminals TC, capable of communicating with each other over a telecommunication network RT.

In one embodiment, the control server SC is included within the social networking server SRS.

The telecommunication network RT may be a wired or wireless network, or a combination of wired and wireless networks.

In one example, the telecommunication network RT is a high-speed IP ("Internet Protocol") packet network, such as the Internet or an intranet.

In another example, the telecommunication network RT is a TDM ("Time Division Multiplexing") network or a private network specific to a company supporting a proprietary protocol.

A communication terminal TC of one user is connected to the social networking server over the telecommunication network RT.

In one example, a communication terminal is a personal computer directly linked by modem to an xDSL ("Digital Subscriber Line") or ISDN ("Integrated Services Digital Network") link connected to the telecommunication network RT.

In another example, a communication terminal is a mobile cellular radiocommunication terminal, linked to the telecommunication network by a radiocommunication channel, for example of the GSM ("Global System for Mobile communications") or UMTS ("Universal Mobile Telecommunications System") type.

In another example, a communication terminal comprises an electronic telecommunication device or object that may be a personal digital assistant (PDA) or a smartphone, capable of being connected to an antenna on a public wireless local area network WLAN, a network using the 802.1x standard, or a wide area network using the WIMAX ("World wide Interoperability Microwave Access") protocol, connected to the telecommunication network.

The social networking server SRS is a server providing a social networking site through which users registered on the server SRS can share multimedia objects, containing for example, audio, video, or text content.

The control server SC comprises a filtering module FIL and a publication module PUB.

In the remainder of the description, the term module may designate a device, a software program, or a combination of computer hardware and software, configured to execute at least one particular task.

The filtering module FIL contains sets of keywords EnsMC respectively associated with user identifiers IdU. A user identifier may also be linked to other words or names designating the user, such as surnames, or linked to the user's own conversation area, such as a "wall" on the social networking site.

For example, a user connects to the control server SC through a communication terminal TC, and defines several keywords matching subjects in which he or she does not want to be involved upon publication of messages on these subjects within the social networking server. To that end, the user may for example interact with a application present on the social networking site and collaborating with the control server SC.

The control server SC acts as a firewall. For example, if a first user posts a message on the social networking site that contains at least one of the keywords defined by a second user, publication of the message is blocked, until the second user authorises it.

The filtering module FIL associates several keywords with each keyword having a contextual and semantic relationship with the keyword. For example, the association is made based on a knowledge base, such as Wordnet™ or DBpedia™. The knowledge base may manage ontologies based upon which keywords are determined and which may also point to resources or URIs ("Uniform Resource Identifiers") to enrich the database.

Therefore, the user initially defines a few keywords and the filtering module FIL expands the scope of the meaning of the keywords by producing a set EnsMC of keywords based on a few keywords. In other words, it is considered that the user produces a first set of keywords and the filtering server FIL produces a second set of keywords, the second set containing the first set. It is also considered that each keyword initially defined by the user is associated with a subset of keywords EnsS such that all of the keywords initially defined are associated with the set of keywords EnsMC composed of various subsets of keywords EnsS.

Additionally, each keyword initially defined by the user may also be disambiguated and associated with a concept by using an ontology based on structures such as OWL ("Web Ontology Language") or RDF ("Resource Description Framework"). Moreover, when there is at least one homonym to a keyword defined by the user, the latter may be invited to select the desired keyword. For example, a user having defined "Java" as a keyword may be invited to choose between "Java" meaning the programming language, "Java" meaning the geographic location, or "Java" meaning a party.

The set of keywords EnsMC may contain synonyms of some keywords, or keywords associated with concepts that are semantically and contextually linked with concepts associated with some keywords.

It is considered that the set of keywords EnsMC contains keywords with a contextual and semantic relationship with the keywords initially defined by the user. It is also considered that the synonyms of a keyword have a contextual and semantic relationship with said keyword.

In one example, an initial keyword may designate a film, the associated keywords might correspond to the producer, director, actors, topics covered in the film, or locations in which the plot of the film takes place, the associated keywords belonging to the context of the initial keyword.

In another example, a keyword might be "cat", the associated keywords might be "animal", "feline", and "kitten", the associated keywords belonging to the same family as the initial keyword or having a hierarchical link with the initial keyword according to a given ontology.

The set of keywords EnsMC associated with a user identifier is also associated with a contact list LC defined by the user. The contact list may contain identifiers for contacts who are friends of the user, which is to say they have a social relationship defined as "friend" within the social networking site, or a direct social relationship with the user. The set of contacts may contain identifiers for contacts who are specifically selected by the user and might not be friends of the user.

The publication module PUB semantically analyses the text data DonT of a message Mes intended to be published in order to extract keywords and potentially the concepts associated with the keywords or sets of words contained in the message and to check whether or not these extracted keywords are included in a set of keywords EnsMC stored in the filtering module FIL.

In one embodiment, the publication module PUB blocks any message provided by a first user when a keyword is extracted from it that is included in a set of keywords associated with a second user having placed the first user on his or her contact list LC, and alerts the second user to request authorisation to publish the message from him or her. If the keyword is included in several sets of keywords associated respectively with several users, each of the users involved is alerted.

Additionally, only one user concerned by a message may be alerted when information associated with the message makes it possible to identify that user. For example, if the name or surname of the user is mentioned in the message or if the message is intended to be published on the user's "wall", only this user will be alerted, or alternatively, this user will be alerted before the other users that may be involved. To that end, the information associated with the message is analysed based on data linked to the user identifiers IdU associated with the sets of keywords EnsMC.

Optionally, the user may assign a score to each keyword that he or she defines, and therefore to each subset of corresponding keywords EnsS. Thus, the publication module PUB will first alert the users for whom a keyword extracted from a message is included in a subset of keywords EnsS to which the assigned score is highest, the users who are still involved but did not assign a score being alerted after those who assigned a score.

In an example for illustrative purposes, a user named "David" wishes to publish the following message:

"Bob, I am very pleased that you joined the liberal party".

The publication module PUB extracts, for example, the keyword "politics" based on a semantic analysis of the message. Therefore, the control server SC may block the message and alert the user Bob if the latter initially defined the keyword "liberalism" and placed David on his contact list LC, the keyword "politics" being included in the subset of keywords EnsS associated with the keyword "liberalism" and containing for example the keywords "liberalism" and "politics".

In other embodiments, only Bob is alerted, or else Bob is alerted first and then the other users associated with at least one subset of keywords containing the keyword "politics" and having placed David in their contact list.

In another case, David wishes to publish the following message on Bob's "wall":

"I am very pleased that you joined the liberal party".

In this case, the control server SC will act as previously described.

In another case, David wishes to publish the following message on his own "wall":

"I am very pleased that my old friend joined the liberal party".

In this case, the control server SC will alert all users associated with at least one subset of keywords containing the keyword "politics" and having placed David on their contact list.

Optionally, a user may assign a valid duration to at least one given keyword. Therefore, the given keyword will no longer be considered for blocking messages after the expiration of the valid period. A user may defined a keyword related to a specific event, such as "party" or "birthday" to which he or she assigns a valid duration of "one month" to be alerted of any message that comes from one of his or her contacts and that is related to a party the user attended or to the user's birthday.

With reference to FIG. 2, a method for controlling the publication of messages according to one embodiment of the invention comprises the steps E1 to E4 executed within the communication system.

In a preliminary step E01, a first user registered with the social networking server SRS connects to the control server SC through a communication terminal TC and a dedicated application, and defines keywords corresponding to subjects in which he or she does not want to be involved upon publication of messages on said subjects on the social networking site managed by the server SRS.

In a preliminary step E02, the filtering module FIL on the control server SC expands the keywords defined by the first user to a set of keywords EnsS having a contextual and semantic relationship with the keywords initially defined by the first user. The first user also defines a contact list LC in order to be alerted when a contact included on the list wishes to publish a message intercepted by the control server SC.

The filtering module FIL stores an identifier IdU for the first user together with the set of keywords EnsMC and the contact list LC.

In step E1, a second user registered on the social networking server SRS and included on the contact list LC wishes to publish a message Mes on the social networking site.

The publication module PUB of the control server SC intercepts the message Mes containing text data DonT.

In step E2, the publication module PUB extracts keywords associated with the text data DonT based on a semantic analysis of the text data.

In step E3, the publication module PUB blocks publication of the message Mes if at least one extracted keyword is included in the set of keywords EnsMC associated with the first user, previously stored by the filtering module FIL.

In step E4, the publication module PUB alerts the first user of the attempt to publish the message Mes and requests authorisation from the first user to publish the message. Therefore, the message is placed in a queue until its publication is authorised or refused by the user.

The invention described here relates to a method and a server for controlling the publication of multimedia objects. According to one embodiment of the invention, the steps of the inventive method are determined by the instructions of a computer program incorporated into a server, such as the server SC. The program comprises program instructions, which when said program is loaded and executed within the server, carry out the steps of the inventive method.

Consequently, the invention also applies to a computer program, particularly a computer program on or within an information medium, suitable to implement the invention. This program may use any programming language, and be in the form of source code, object code, or intermediate code between source code and object code, such as in a partially compiled form, or in any other form desirable for implementing the inventive method.

The invention claimed is:

1. A method for controlling publication of messages on a social networking server, comprising the following within a server capable of communicating with the social networking server:
   intercepting, via at least one processor, a message containing text data, the message being provided by a user registered on the social networking server, and intended to be published by the social networking server,
   extracting, via the at least one processor, keywords associated with the text data based on a semantic analysis of the text data,
   blocking, via the at least one processor, publication of the message when at least one extracted keyword is included in a set of keywords associated with another user registered with the social networking server, the set of keywords containing keywords associated with concepts that are semantically and contextually linked with concepts associated with keywords initially defined by the other user and having at least one keyword initially defined by the other user assigned a valid period by the other user, the user being included on a list initially defined by the other user,
   alerting the other user of the attempt to publish the message, and
   requesting authorization from the other user to publish the message,
   wherein privacy protection for the other user is managed before any publication of the message.

2. A method according to claim 1, wherein the keywords initially defined by the other user are included in the set of keywords.

3. A method according to claim 1, wherein each keyword initially defined by the other user is disambiguated and associated with a concept by using a given ontology.

4. A method according to claim 1, wherein the set of keywords contains synonyms of the keywords initially defined by the other user.

5. A method according to claim 1, wherein the other user assigns a score to at least one keyword initially defined by the other user.

6. The method as set forth in claim 1 further comprising placing the message in a queue until publication is authorized or refused by the other user.

7. A server for controlling publication of messages within a social networking server, the server comprising a memory and at least one processor being capable of communicating with the social networking server configured to:
- intercept, via the at least one processor, a message containing text data, the message being provided by a user registered on the social networking server, and intended to be published by the social networking server,
- extract, via the at least one processor, keywords associated with the text data based on a semantic analysis of the text data,
- block, via the at least one processor, publication of the message when at least one extracted keyword is included in a set of keywords associated with another user registered with the social networking server, the set of keywords containing keywords associated with concepts that are semantically and contextually linked with concepts associated with keywords initially defined by the other user and having at least one keyword initially defined by the other user assigned a valid period by the other user, the user being included on a list initially defined by the other user,
- alert the other user of the attempt to publish the message, and
- request authorization from the other user to publish the message, whereby privacy protection for the other user is managed before any publication of the message.

8. The server as set forth in claim 7 further configured to place the message in a queue until publication is authorized or refused by the other user.

9. A method implemented by a non-transitory computer readable storage medium, in which a program is saved, the program capable of being implemented within a server for controlling publication of messages within a social networking server, the server being capable of communicating with the social networking server, the program comprising instructions which, when the program is loaded and executed within the authentication server, perform:
- intercepting a message containing text data, the message being provided by a user registered on the social networking server, and intended to be published by the social networking server,
- extracting keywords associated with the text data based on a semantic analysis of the text data,
- blocking publication of the message when at least one extracted keyword is included in a set of keywords associated with another user registered with the social networking server, the set of keywords containing keywords associated with concepts that are semantically and contextually linked with concepts associated with keywords initially defined by the other user and having at least one keyword initially defined by the other user assigned a valid period by the other user, the user being included on a list initially defined by the other user, and
- alerting the other user of the attempt to publish the message, and
- requesting authorization from the other user to publish the message,
- wherein privacy protection for the other user is managed before any publication of the message.

10. The method as set forth in claim 9 further comprising placing the message in a queue until publication is authorized or refused by the other user.

* * * * *